(12) United States Patent
Buynacek

(10) Patent No.: US 6,490,964 B2
(45) Date of Patent: Dec. 10, 2002

(54) MASTER BRAKE CYLINDERS HAVING OVERMOLDED SEALS

(75) Inventor: Connie J. Buynacek, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/766,748

(22) Filed: Jan. 22, 2001

(65) Prior Publication Data
US 2001/0032463 A1 Oct. 25, 2001

Related U.S. Application Data
(60) Provisional application No. 60/177,885, filed on Jan. 24, 2000.

(51) Int. Cl.$^7$ .............................. F16J 1/00; B60T 11/20
(52) U.S. Cl. ............................................ 92/248; 60/562
(58) Field of Search ......................... 92/248, 249, 253; 60/562

(56) References Cited

U.S. PATENT DOCUMENTS

| | | | | |
|---|---|---|---|---|
| 3,730,060 A | * | 5/1973 | DeCarbon | 92/249 |
| 4,821,627 A | * | 4/1989 | Leigh-Monstevens | 92/107 |
| 5,081,172 A | * | 1/1992 | Chaffee et al. | 524/188 |
| 5,577,641 A | * | 11/1996 | De Laforcade et al. | 222/386 |
| 6,270,901 B1 | * | 8/2001 | Parsonage et al. | 428/421 |

* cited by examiner

Primary Examiner—Edward K. Look
Assistant Examiner—Thomas E. Lazo
(74) Attorney, Agent, or Firm—Scott A. McBain

(57) ABSTRACT

A master brake cylinder for use in a braking system of a vehicle, which contains pistons, having seals molded thereon. Overmolding the elastomer directly onto the pistons forms the seals. Also disclosed are improved master brake cylinder pistons having seals for automotive and other vehicles, and master brake cylinders which comprise brake fluid resistant, synthetic elastomer seals molded directly onto the piston of the master brake cylinder.

14 Claims, 3 Drawing Sheets

MASTER BRAKE CYLINDERS HAVING OVERMOLDED SEALS

CLAIM FOR PRIORITY

This is a non-provisional patent application, filed claiming the priority of a provisional patent application filed on Jan. 24, 2000, having Ser. No. 60/177885.

TECHNICAL FIELD

The invention relates to improved master brake cylinders for vehicles, such as automobiles, vans, and trucks.

BACKGROUND OF THE INVENTION

The hydraulic brake system of vehicles, such as automobiles, vans, and trucks (hereinafter and in the claims referred to collectively as, "vehicles") consists of a master brake cylinder and pistons. The system is interconnected by pipes and hoses to disk brake calipers or wheel cylinders, located on each wheel of the vehicle. The master brake cylinder and its associated parts are filled with special high temperature resistant brake fluid. When the brake pedal is applied, its force is transmitted to the pistons of the master brake cylinder, which develops hydraulic pressure, which is then transmitted to the disk brake calipers or wheel cylinders.

To more fully understand the operation and design of a master brake cylinder, a typical master brake cylinder configuration is detailed in FIG. 1. In FIG. 1, there is illustrated a master brake cylinder 10. It is composed of a brake fluid reservoir 12, having primary port 14, and secondary port 16, as well as primary piston compensating port 18, and secondary compensating port 20, with all of these ports being in fluid communication with the interior of master brake cylinder 22.

Master brake cylinder 22 has positioned within its interior primary piston 24, having a front end 26, and a back end 28. Fitted to the front end 26 is primary seal 30. This seal is engaged by and partially held in position by its being urged against the concave side of spring retainer 32, which is attached to the piston by extension screw 36, described below. Spring retainer 32 has its non-concave side in contact with piston spring 34, which assists in holding the spring retainer 32 in place. Emanating from front end 26 of primary piston 24 is piston extension screw 36, which is attached to primary piston stop 38. The back end 28 of primary piston 24 is fitted with O-ring seal 40.

The back end 42 of secondary piston 44 is fitted with a secondary seal 46. The front end 48 of secondary piston 44 is fitted with primary seal 50, which is urged against the front end 48 by spring retainer 52. The front of spring retainer 52 engages one end of secondary piston spring 54, with the other end of secondary piston spring 54 being positioned along the end of master brake cylinder 22.

Two lines (not shown) deliver fluid from the master brake cylinder 22. The action of the brake is actuated by the driver of the vehicle depressing brake pedal (not shown), which is connected to output rod 60, which engages the back end 28 of primary piston 24.

When the brake pedal is depressed, it causes output rod 60 to move primary piston 24 and secondary piston 44 forward, compressing piston springs 34 and 54. As the pistons move forward, brake fluid is displaced into rear and front brake lines (not shown), which causes the front and rear brakes to engage the drums or calipers (not shown). Upon retraction of the output rod 60, brake fluid returns into the master brake cylinder 22, and primary piston spring 34 and secondary piston spring 54 urge the primary and secondary pistons 24 and 44 back to the status of the brake pedal not being applied. Primary and secondary piston compensating ports 18 and 20 prevent a vacuum from forming as the brake fluid returns. The seals on the primary and secondary pistons 24 and 44 prevent fluid from leaking beyond the pistons 24 and 44.

Seals for the pistons of master brake cylinders, particularly primary seals, have typically been retained on the pistons by mechanical spring retainers. These seal retainers increase the tolerance of the piston assembly stack and, therefore, the tolerance of the entire master brake cylinder assembly. A reduction in tolerance directly contributes to the improved travel to close performance of the master brake cylinder assembly. Travel to close is a vehicle performance parameter for pedal travel and pedal feel. Any elimination of parts also results in cost savings for the master brake cylinder assembly.

When seals are assembled over a piston and retained in a groove of the piston, only certain materials could be used. These materials had to be capable of being stretched for assembly and still retain enough elasticity to return to their original configuration once in the groove to seal against the piston. The assembly process for attaching the seals to the pistons requires the strenuous handling of the pistons. Because of this, the use of high temperature plastics as a material for producing pistons has not been fully exploited by the art. For instance, phenolic resins that are characteristically brittle would be damaged if dropped during the master brake cylinder assembly process, and, typically, seals become cut when assembled over the phenolic surface.

It would be beneficial to solve the above-described problems relating to the seals and at the same time reduce the cost of production and reduce the number of parts necessary in the master brake cylinder.

SUMMARY OF THE INVENTION

One aspect of the invention provides an improved master brake cylinder used in the braking systems of vehicles. These master brake cylinders comprise a cylinder, having a reservoir for supplying brake fluid to the cylinder. Within the cylinder, there are a primary piston and a secondary piston. Brake fluid resistant elastomeric seals are mechanically retained onto the primary and secondary pistons. The improvement made to these master brake cylinders resides in having the elastomeric seals molded directly onto the primary and secondary pistons.

Another aspect of the invention is an improved piston for master brake cylinders of vehicles that comprise a piston, having a front and a back, and having channels about their circumferences. Directly molded into the channels is a brake fluid resistant, synthetic elastomer seal. It should be understood that the present invention contemplates the use of commonly used brake fluids.

Another aspect of the invention resides in that the channels described above are U-shaped.

Another aspect of the invention has the channel in the back end containing a circumferential rib.

Another aspect of the invention involves the use of the pistons being made of metal, preferably a non-ferrous metal.

Another aspect of the invention allows plastics to be used to fabricate the pistons, with a preferred plastic being a phenolic resin.

Another aspect of the invention resides in molding to the pistons elastomers, which are chemically resistant to brake fluids. One such group of elastomers is the ethylene propylene elastomers, which includes terpolymers of these copolymers.

Another aspect of the invention utilizes as the brake fluid resistant elastomers such elastomers as chloroprene neoprene elastomers, fluorosilicone elastomers, sulphonate polyethylene elastomers, and chlorinated polyethylene elastomers.

Another aspect of the invention utilizes with phosphate ester brake fluids metal pistons, particularly, non-ferrous metal pistons, as well as plastic pistons, such as phenolic resin pistons.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 1:
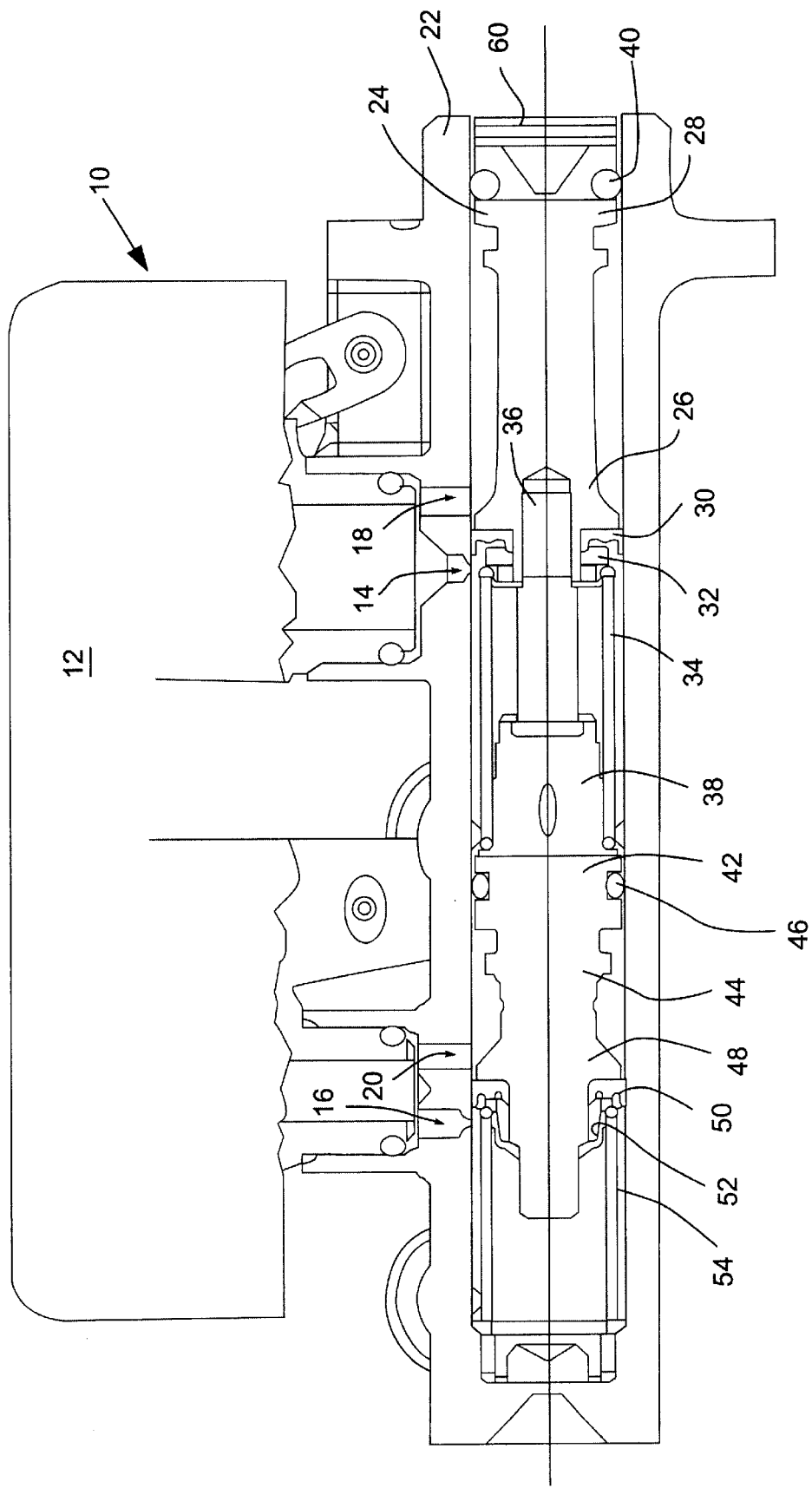
FIG. 1 is a partial horizontal cutaway view of a typical prior art master brake cylinder system showing the primary and secondary pistons fitted with conventional seals.
Figure 2:
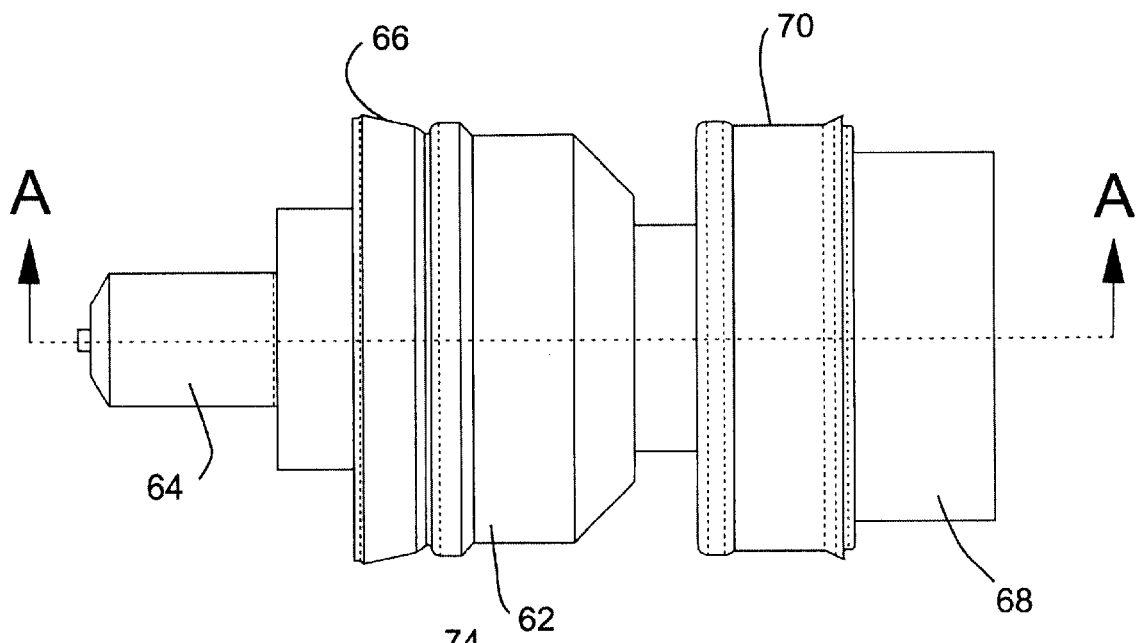
FIG. 2 is a horizontal view of an improved secondary piston for use in a master brake cylinder being fitted with seals that are overmolded thereto.
Figure 3:
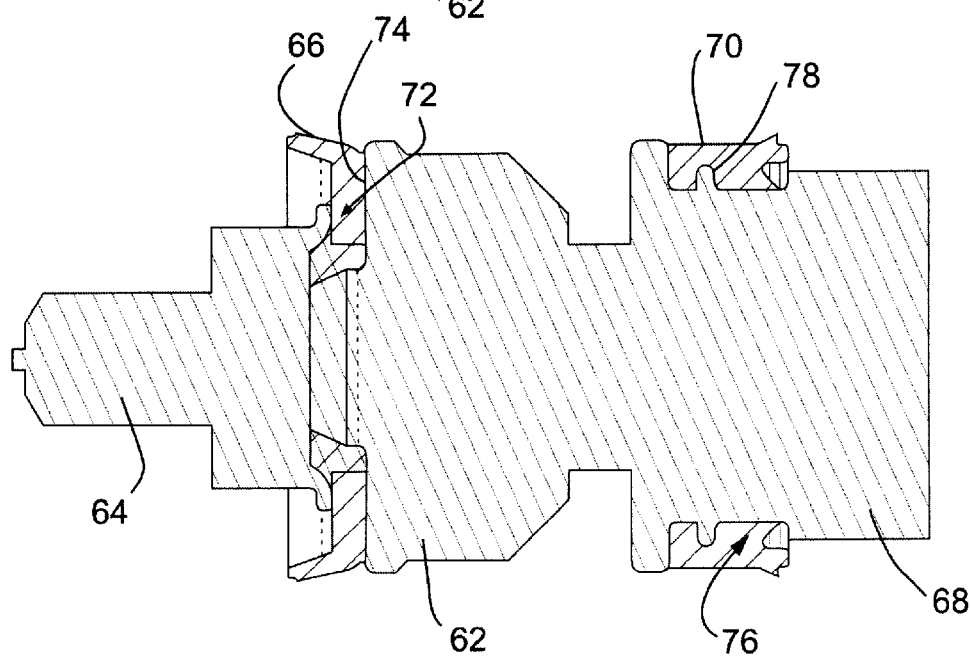
FIG. 3 is a sectional view of FIG. 3 across the lines A—A.

FIGS. 2 and 3 show a secondary piston, which most often will be formed from non-ferrous metals, such as aluminum, or may be formed using a ferrous metal. This secondary piston is designated generally by the numeral 62. Its front end 64 contains primary seal 66 overmolded thereto. The back end 68 is fitted with secondary seal 70. Since the seals 66 and 70 are overmolded onto the piston 62, the geometry of the front end of the piston is formed to provide a U-shaped groove 72 extending about the circumference of the face 74 of the front end 64.

The back end 68 is formed so that it contains a U-shaped groove 76 about its circumference, with an extending portion, flange or rib 78 located in the bottom portion of the groove 76. The provision of the U-shaped grooves 72 and 76 provide increased surface area to receive in good bonding relationship seals 66 and 70. It is important to note that by using this scheme, it is no longer necessary to use spring retainers 32 or 52, previously described, or to rely upon the expansion of springs to maintain the primary seals against the front end of the pistons. Since the seals are molded, preferably using injection-molding techniques, the elastomer from which the seal is fabricated is not stretched or in any way forced onto the piston, thus improving its mechanical integrity.

In addition to phenolic resins, other polymers such as Nylon, polyamide resins, high density polypropylene, and other high temperature resistant plastics may be used to fabricate the pistons.

Rubber-to-metal molding is a known process for molding rubber products that are chemically bonded to metal in the vulcanizing process. It is most commonly performed using injection-molding techniques. Rubber molding is known to impart strong, not easily broken bonds to the surfaces upon which it is employed. Examples of areas in which it is known to employ molding of elastomers onto solid surfaces include such areas as vibration-isolating mounts for computer, office, and high-speed production equipment; seals for aerospace systems; overmolded spool valves; poppets; plunger pins for use in pop-off valves; and rubber-to-metal seals and rollers. It is sometimes referred to as overmolding. The bond strengths are usually as strong as the rubber. The bonding of rubber to metal can also be achieved by the use of chemical adhesives, such as the well know cyanoacrylate adhesives.

The invention, as stated, allows seals to be placed on existing metal pistons without the necessity of using retaining devices. Also, more importantly, by using the invention it is possible to simplify piston design, and, by the use of known molding techniques, produce strong seals having a greater capability of preventing fluid loss or leakage than their prior art or counterparts that were installed with springs or grooves. When the seals are bonded to presently used metal pistons using the practices of the invention, the following advantages are obtained. First, the process eliminates the seal to piston assembly. Second, the process eliminates the seal retainer. Third, the process reduces the seal/piston interface tolerances for better travel to close.

When seals are bonded to as-cast pistons, the following advantages are achieved. First, it eliminates the seal to piston assembly. Second, it eliminates the seal retainer. Third, it reduces the seal/piston interface tolerances for better travel to close. Fourth, it eliminates the machining of the piston. Fifth, it eliminates the anodizing of the piston. Sixth, it is easier to mechanically bond. Seventh, it possibly eliminates the bore anodize. Eighth, it is possible to reduce the weight of the assembly.

When plastic pistons are employed and have the seals bonded thereto in accordance with the invention, the following advantages are present. First, it eliminates the seal to piston assembly. Second, it eliminates the seal retainer. Third, it reduces the seal/piston interface tolerances for better travel to close. Fourth, it eliminates the machining of the piston. Fifth, it eliminates the anodizing of the piston. Sixth, it is easier to mechanically bond. Seventh, it possibly eliminates the bore anodize. Eighth, it is possible to reduce the weight of the assembly. Ninth, it affords greater flexibility in piston design.

Figure 4:
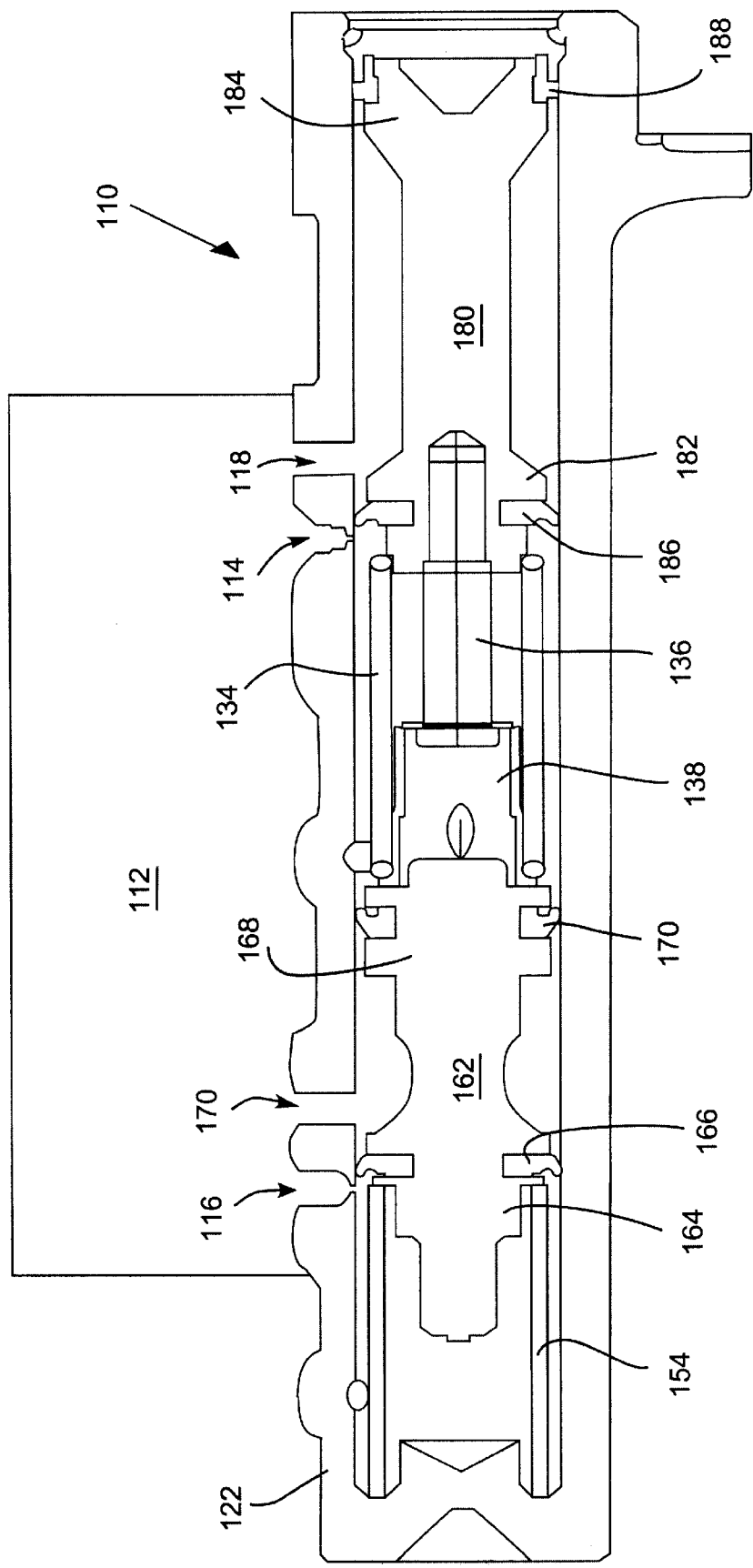
FIG. 4 is a partial horizontal cutaway view of an embodiment of a master brake cylinder system including the present invention.

Referring to FIG. 4, a master brake cylinder is shown including the overmolded pistons of the present invention. A master brake cylinder is shown generally at numeral 110. It is composed of a brake fluid reservoir 112, having primary port 114, and secondary port 116, as well as primary piston compensating port 118, and secondary compensating port 120, with all of these ports being in fluid communication with the interior of master brake cylinder 122.

Master brake cylinder 122 has positioned within its interior primary piston 180, having a front end 182, and a back end 184. Fitted to the front end 182 is primary seal 186. Emanating from front end 182 of primary piston 180 is piston extension screw 136, which is attached to and pushes primary piston stop 138. Positioned adjacent the front end 182 is primary spring 134, one end of which is positioned against the front end 182 and the other of which is positioned against stop 138. The back end 184 of primary piston 180 is fitted with secondary seal 188. The front end 182 of primary piston 180 is fitted with primary seal 186.

The back end 168 of secondary piston 162 is fitted with a secondary seal 170. The front end 164 of secondary piston 162 is fitted with primary seal 166. The front end 164 has positioned thereagainst one end of secondary piston spring 154, with the other end of secondary piston spring 154 being positioned along the end of master brake cylinder 122. The general operation of the master brake cylinder 110, with respect to the fluid flow in the brake cylinder and so on, is not substantially different from that of the prior art.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A master brake cylinder for use in a braking system of a vehicle comprising:
    a cylinder having a reservoir for supplying brake fluid to the cylinder;
    a primary piston and a secondary piston movably positioned within the cylinder;
    brake fluid resistant elastomeric seals mechanically molded on the primary and secondary pistons.

2. The master brake cylinder of claim 1, wherein the pistons are metal pistons.

3. The master brake cylinder of claim 2, wherein the metal pistons are ferrous metal pistons.

4. The master brake cylinder of claim 1, wherein the pistons are non-ferrous pistons.

5. The master brake cylinder of claim 4, wherein the non-ferrous pistons are phenolic resin pistons.

6. A master brake cylinder having seals for automotive master brake cylinders that comprise phosphate ester brake fluid resistant elastomer seals molded directly onto at least one piston,
    wherein the phosphate ester brake fluid resistant elastomer is a chloroprene neoprene elastomer.

7. A master brake cylinder having seals for automotive master brake cylinders that comprise phosphate ester brake fluid resistant elastomer seals molded directly onto at least one piston
    wherein the at least one piston is a phenolic resin piston.

8. A piston for a master brake cylinder of a vehicle comprising:
    at least one piston, the piston including a front end and a back end, the front end and the back end each including a channel formed about its circumference, each of the channels including a brake fluid resistant, synthetic elastomeric seal molded directly therein.

9. The piston of claim 8, wherein each of the channels are U-shaped channels.

10. The piston of claim 8, wherein the channel about the circumference of the back end has a circumferential rib located at its bottom portion.

11. The piston of claim 8, wherein the at least one piston is a metal piston.

12. The piston of claim 11, wherein the at least one metal piston is a ferrous metal piston.

13. The piston of claim 8, wherein the at least one piston is a non-ferrous piston.

14. The piston of claim 13, wherein the at least one piston is a phenolic resin piston.

* * * * *